US008316696B2

(12) United States Patent
Davey et al.

(10) Patent No.: US 8,316,696 B2
(45) Date of Patent: Nov. 27, 2012

(54) SENSOR FOR DETECTING SURFACE CRACKS IN A COMPONENT OR STRUCTURE

(75) Inventors: Kenneth Davey, Walpole (AU); Nigel Laxton, Mt. Hawthorn (AU)

(73) Assignee: Structural Monitoring Systems Ltd., Osborne Park (AU)

( * ) Notice: Subject to any disclaimer, the term of this patent is extended or adjusted under 35 U.S.C. 154(b) by 807 days.

(21) Appl. No.: 12/299,603

(22) PCT Filed: May 4, 2007

(86) PCT No.: PCT/AU2007/000603
§ 371 (c)(1),
(2), (4) Date: Mar. 9, 2009

(87) PCT Pub. No.: WO2007/128067
PCT Pub. Date: Nov. 15, 2007

(65) Prior Publication Data
US 2010/0005862 A1  Jan. 14, 2010

(30) Foreign Application Priority Data
May 5, 2006  (AU) ................ 2006902360

(51) Int. Cl.
*G01M 3/08* (2006.01)
(52) U.S. Cl. .......................... 73/46; 411/378
(58) Field of Classification Search ............. 73/37–52; 411/378; 376/245
See application file for complete search history.

(56) References Cited

U.S. PATENT DOCUMENTS

| | | | |
|---|---|---|---|
| 4,171,636 A | 10/1979 | Bergeron | |
| 6,373,914 B1 | 4/2002 | Gill et al. | |
| 6,539,776 B2* | 4/2003 | Davey | ............... 73/37 |
| 6,715,365 B2* | 4/2004 | Davey | ............... 73/799 |
| 2002/0092355 A1 | 7/2002 | Davey | |
| 2003/0110838 A1 | 6/2003 | Summers et al. | |

FOREIGN PATENT DOCUMENTS

| | | |
|---|---|---|
| AU | 2006901823 | 4/2006 |
| EP | 2059779 A1 | 11/2007 |
| WO | 9715814 A1 | 5/1997 |
| WO | 01/84102 A1 | 11/2001 |
| WO | 01/98746 A1 | 12/2001 |
| WO | 03027561 A1 | 4/2003 |

OTHER PUBLICATIONS

Australian Patent Office, International Search Report, International Application No. PCT/AU2007/000603, Jul. 27, 2007, 3 pages.

(Continued)

*Primary Examiner* — Hezron E Williams
*Assistant Examiner* — Hoang Nguyen
(74) *Attorney, Agent, or Firm* — Graybeal Jackson LLP

(57) ABSTRACT

A sensor for detecting surface cracks in a component or structure. A preferred embodiment of the device comprises a flat body portion with a central hole through which a main structural bolt passes. The body portion has a throughway providing fluid communication between an exterior port and a substantially hermetically-sealed area on the structural surface being monitored. A crack which develops in the monitored area surrounding the bolt hole will cause venting of the hermetically-sealed area, in turn causing a change in fluid pressure that can be detected and/or measured to warn of the presence of the crack.

30 Claims, 16 Drawing Sheets

OTHER PUBLICATIONS

European Patent Office, Supplementary European Search Report dated May 24, 2011, for European Patent Application No. EP07718850; 2 pages.

European Patent Office, Supplementary European Search Opinion dated May 24, 2011, for European Patent Application No. EP07718850; 5 pages.

* cited by examiner

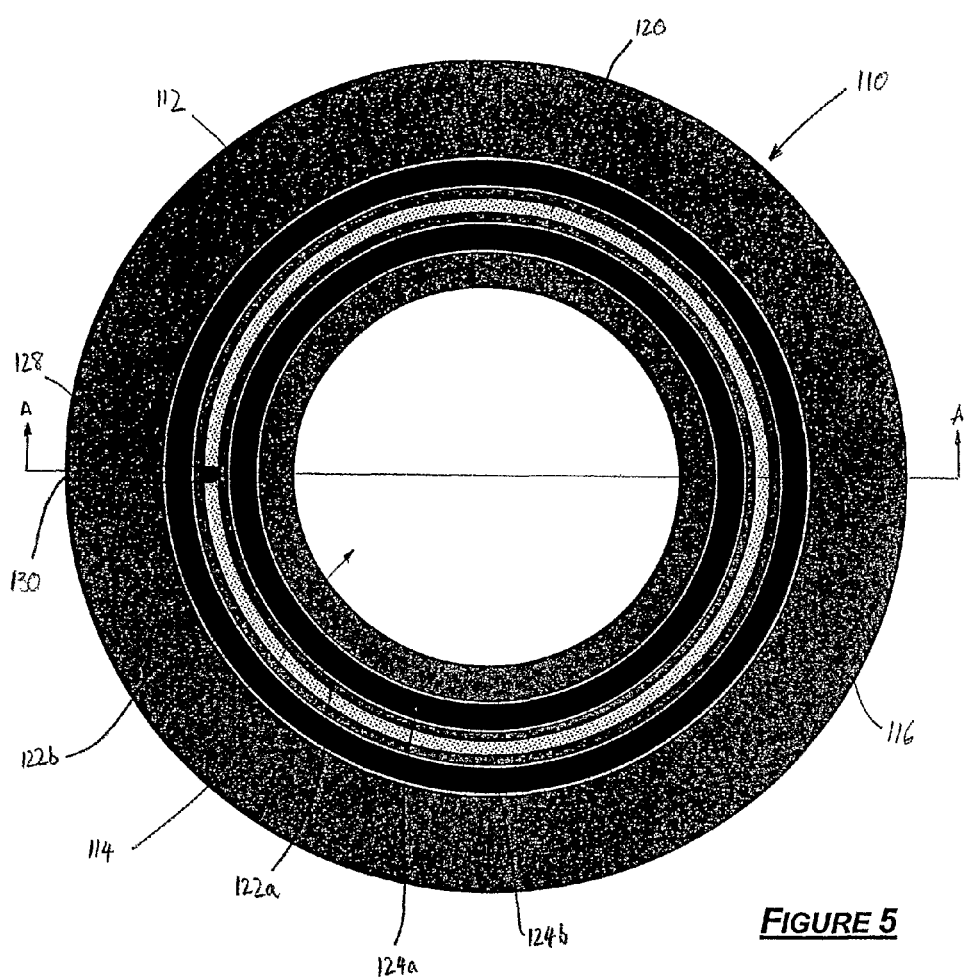
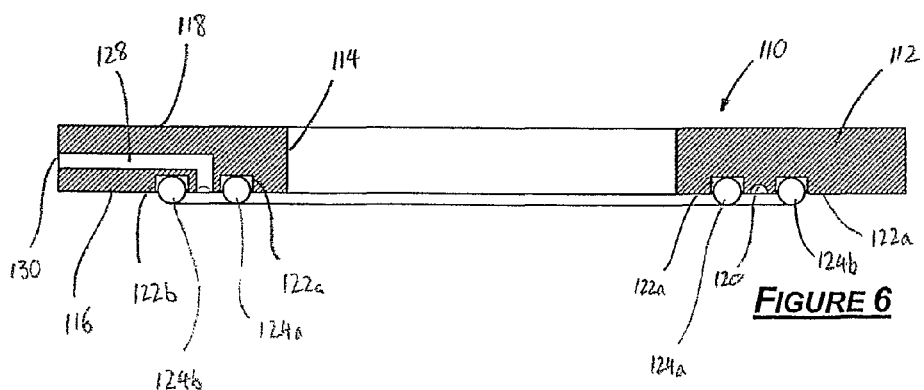
FIGURE 5
FIGURE 6

SENSOR FOR DETECTING SURFACE CRACKS IN A COMPONENT OR STRUCTURE

PRIORITY CLAIM

The present application is a United States national phase application filed pursuant to 35 USC §371 of International Patent Application Serial No. PCT/AU2007/000603, entitled SENSOR FOR DETECTING SURFACE CRACKS IN A COMPONENT OR STRUCTURE, filed May 4, 2007; which application claims priority to Australian Patent Application Serial No. 2006902360, filed May 5, 2006; all of the foregoing applications are incorporated by reference herein in their entireties.

FIELD OF THE INVENTION

The present invention relates to a sensor for detecting surface cracks in a component or structure.

BACKGROUND OF THE INVENTION

It is known that structural discontinuities, such as holes and notches, can cause localized stress concentration in a component or structure. When the applied stress is sufficiently high the stress concentration results in cracks forming in the component or structure, which propagate from the structural discontinuity. Excessive cracking can ultimately lead to failure of the component or structure.

In many structures, such as aircrafts and bridges, holes and fastener assemblies are used to connect components within the structure. A hole site is a structural discontinuity at which failure can first be observed. Early detection of component failure can prevent catastrophic failure. Planning for early detection can be used during the design phase to minimize redundancy within a structure, and thus the overall weight of the structure.

Visual detection of surface cracking that propagates from a hole in a component or structure through which a fastener assembly is disposed can be performed by removing the fastener assembly from the hole. This can be a labor intensive task. Further, the actual removal of a fastener assembly may damage the component or structure and provide the source of a crack. Alternatively, cracks can be observed when they extend beyond the outer edge of the fastener assembly. However, it is to be appreciated that by such a time the crack may already be several millimeters long.

SUMMARY OF THE INVENTION

According to a first aspect of the present invention, there is provided a sensor for detecting surface cracks in a component or structure, the sensor comprising:
  a body portion having: a first surface; a cavity that opens onto the first surface; and a throughway that extends through the body portion and provides fluid communication between the cavity and a second surface of the body portion; and
  a sealing system configured to establish a substantially hermetic seal between the first surface and an outer surface of the component or structure on opposite sides of the cavity in response to a compressive load that is exerted on the body portion.

According to a second aspect of the invention there is provided a sensor for detecting surface cracks in a component or structure having an outer surface, the sensor comprising:
  a body portion having first surface;
  a sealing system cooperating with the body portion to form a cavity that opens onto the first surface, the sealing system configured to form a substantially hermetic seal between the first surface and the outer surface of the component or structure on opposite sides of the cavity;
  wherein the body portion is provided with a conduit that provides fluid communication between the cavity and a port accessible on the body portion.

According to a third aspect of the present invention, there is provided a fastener assembly for fastening a component or structure, the fastener assembly comprising at least one fastener element having a sensor in accordance with the first aspect.

According to a fourth aspect of the present invention, there is provided a method for detecting surface cracks in components joined by a fastener assembly having a fastener element that passes through holes in the components, the method comprising:
  providing a sensor comprising a body portion having a first surface; a cavity that opens onto the first surface, and a throughway that extends through the body portion and provides fluid communication between the cavity and a second surface of the body portion;
  providing a sealing system that is operable between the first surface and the outer surface;
  locating the sensor within the fastener assembly such that the first surface is adjacent the outer surface with the cavity adjacent the outer surface;
  tensioning the fastener assembly to exert a compressive load on the sensor wherein the sealing system establishes the substantially hermetic seal between the first surface and the outer surface on opposite sides of the cavity; and
  monitoring fluid flow through the cavity.

BRIEF DESCRIPTION OF THE DRAWINGS

In order that the invention may be more easily understood, embodiments will now be described, by way of example only, with reference to the accompanying figures, in which:

FIG. 5: is a bottom view of the sensor of FIG. 4;

FIG. 6: is a side cross sectional view of the sensor of FIG. 4, as viewed along the line A-A in FIG. 5;

DETAILED DESCRIPTION OF THE PREFERRED EMBODIMENTS

Figure 1:
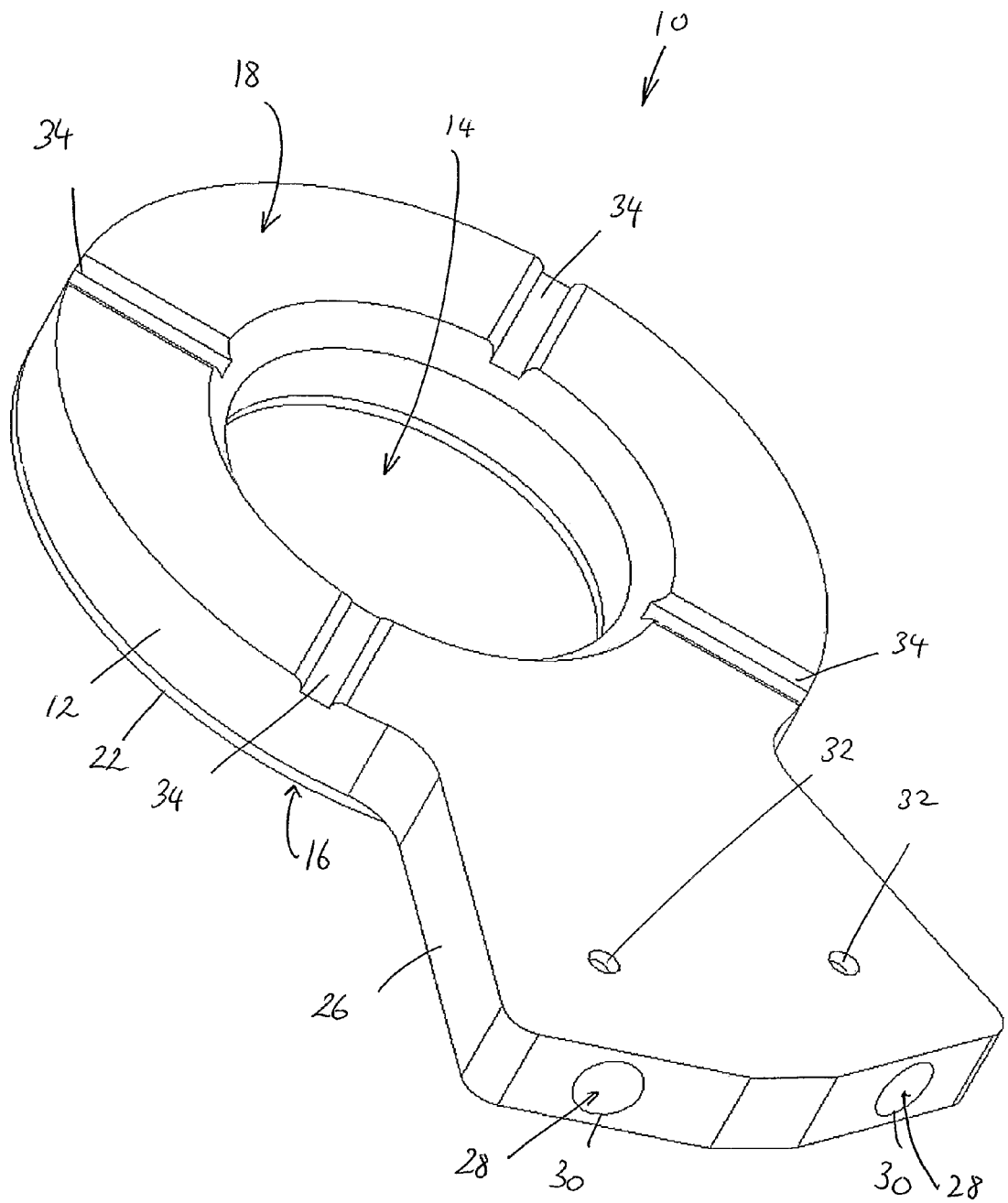
FIG. 1: is an axonometric view of a sensor in accordance with a first embodiment of the present invention.
Figure 2:
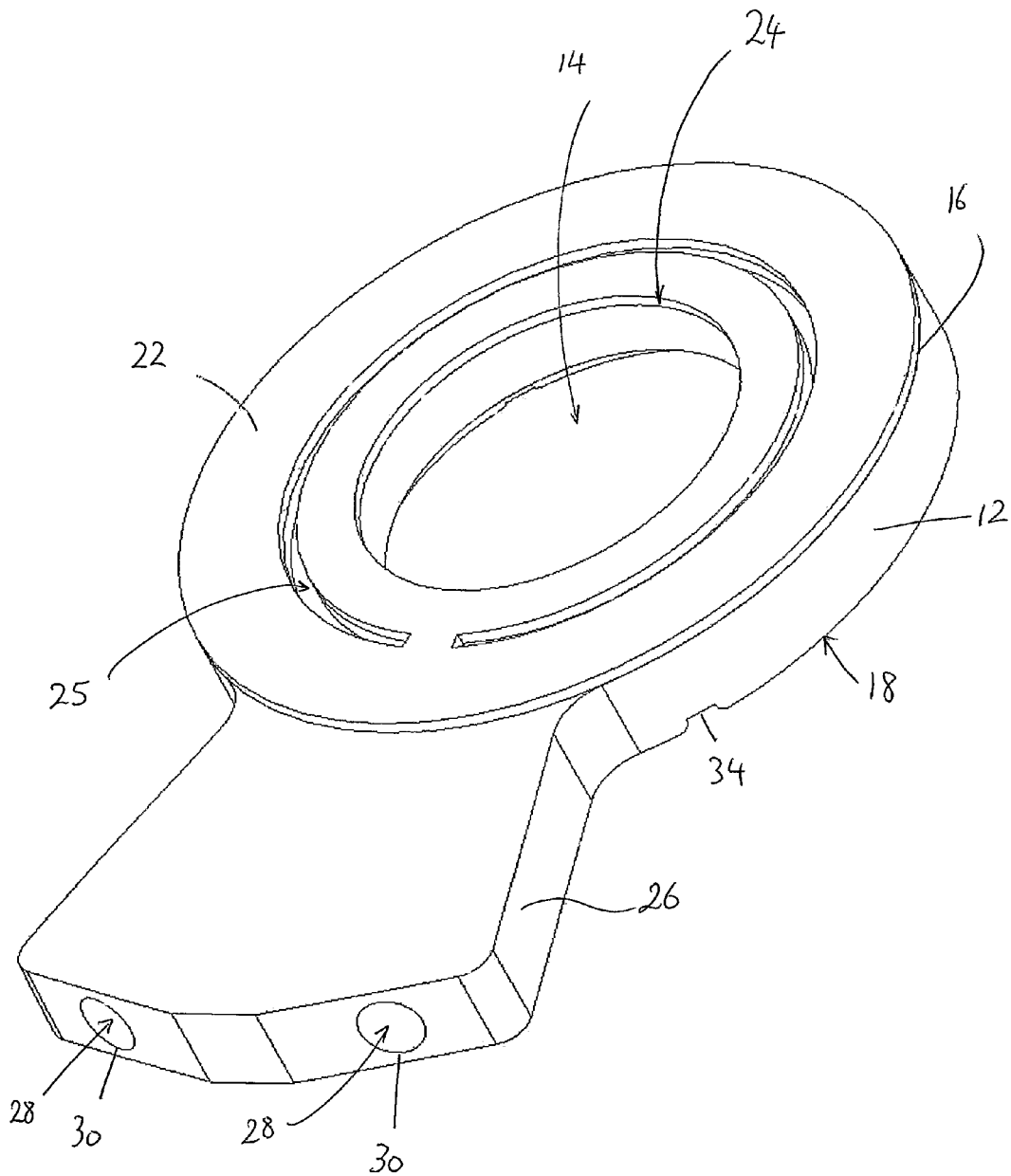
FIG. 2: is an axonometric bottom view of the sensor of FIG. 1.
Figure 3:
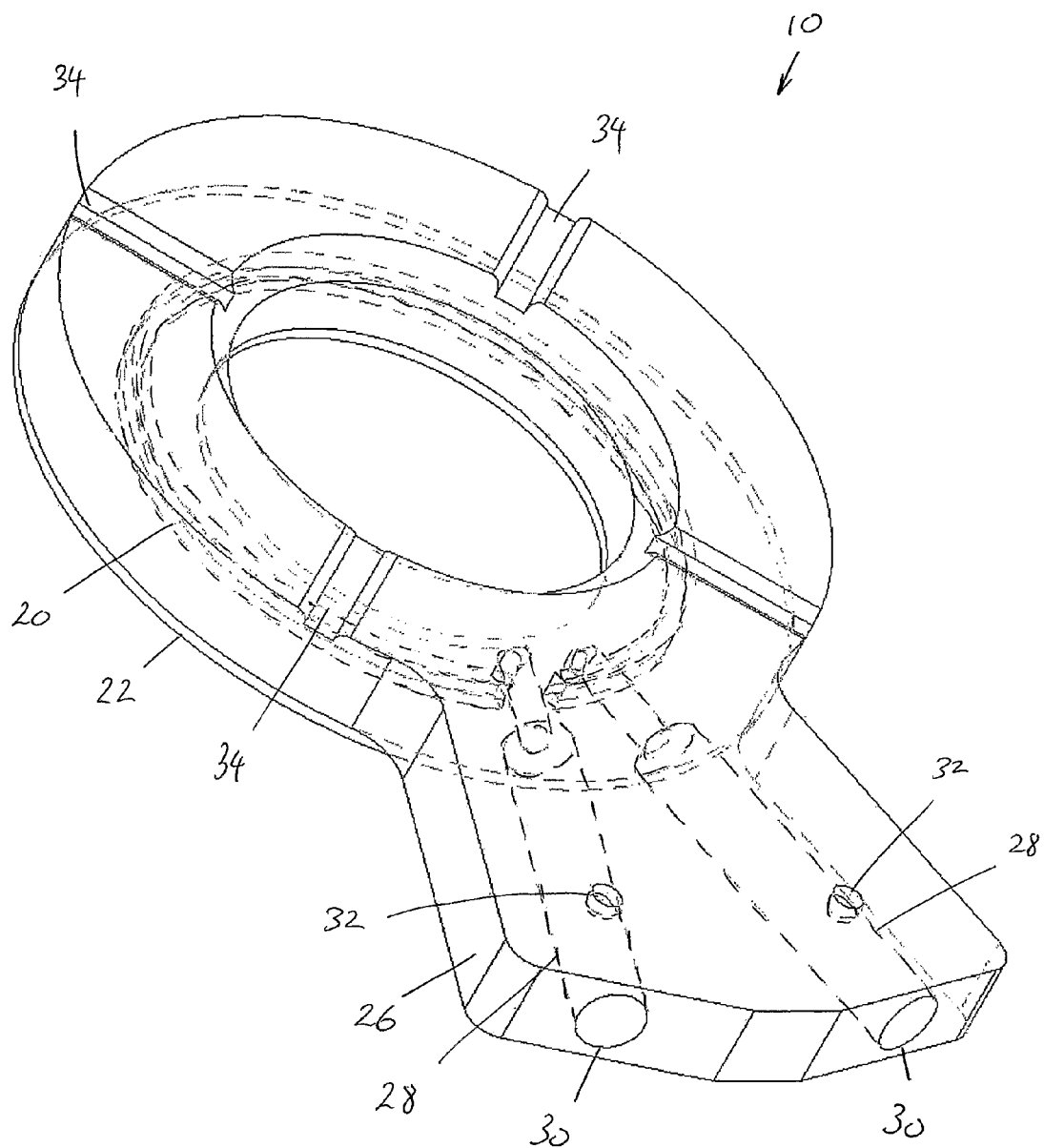
FIG. 3: is a schematic transparent view of the sensor as shown in FIG. 2.

FIGS. 1 to 3 show a sensor 10 in accordance with a first embodiment. The sensor 10 has a body portion 12 that defines a hole 14 through which a fastener element (such as the shank of a bolt) can pass. The body portion 12 has a generally annular shape. The body portion 12 also has a first surface 16 and a second opposing surface 18.

As shown in FIG. 2, the body portion 12 has a cavity, which in this embodiment is in the form of a channel 20 that extends partially through the thickness of the body portion 12 and opens onto the first surface 16. The channel 20 extends about the hole 14. In this embodiment, the channel 20 has a generally C-shape when viewed perpendicularly from the first surface 16.

The sensor 10 is further provided with a sealing system, which in this embodiment is in the form of a compliant stratum 22. The compliant stratum 22 is affixed to the first surface 16 of the body portion 12. A first aperture 24 extends through the stratum 22 and is the same configuration as the hole 14 in the body portion 12. A second aperture 25 extends through the stratum and is substantially the same configuration as the channel 20. The aperture 24 registers with hole 14. Similarly, the aperture 25 registers with the channel 20.

The sensor 10 further has a tail piece 26 extending from the body portion 12. As shown in FIG. 3, two conduits or throughways 28 extend through the tail piece 26. Each throughway 28 has an opening 30 at the end of the tail piece 26 that is remote from the body portion 12. In addition, each throughway 28 opens onto the channel 20 at an end of the C-shape. Each throughway 28 can be considered, and in effect act, as a conduit; and each opening 30 can be considered, and in effect act, as a port which is located on an accessible part of the body portion. Thus the throughways (i.e., conduits) provide fluid communication between the cavity/channel 20 and an opening (i.e., port) 30.

Two secondary holes 32 extend through the tail piece 26. Each of the holes 32 is transverse to, and is in fluid communication with, one of the throughways 28.

The sensor 10 can be installed in a fastener assembly (not shown), which fastens two or more components (also not shown) together. A through hole extends through each of the components, and the components are arranged such that the respective holes are in alignment. A shank, or shank-like member, of one of the fastener elements within the fastener assembly extends through the aperture 14 in the sensor and through the aligned holes in the components. The sensor 10 is arranged such that the compliant stratum 22 is disposed in contact with the outer surface of the component or structure to be monitored.

In response to a compressive load applied to the body portion, which is generated by tension in the shank of the fastener element, the compliant stratum 22 is partially deformed. In this embodiment, the compliant stratum 22 is formed of material that is partially elastic. Accordingly, the deformation is also elastic, such that a substantially hermetic seal is established between the body portion and the outer surface of the component.

A compressive load can be applied to the first and second surfaces 16, 18 by tension in the shank of the fastener element; that is, a distributed load can be applied to the first surface 16 and an equal and opposite force can be applied to the second surface 18. The body portion 12 is capable of supporting the compressive load.

However, it is to be appreciated that the elasticity of the material of the compliant stratum 22, and the dimensions of the aperture 25 should be selected such that when a compressive load (such as that applied by a fastener element) is applied to the compliant stratum 22, the aperture 25 is not pinched or otherwise closed.

When the sensor is located on the outer surface of the component, the channel 20 and the surface of the component together form a conduit that extends between the two throughways 28. Furthermore, when the component is intact (that is, no surface cracks are present) a substantially hermetic seal can be formed between the body portion 12 and the surface of the component. Thus, the conduit is in fluid communication with the throughways 28, but in fluid isolation from the atmosphere surrounding the sensor 10.

Tubing, such as flexible piping (not shown), can be connected to the throughways 28 of the sensor 10 via either the opening 30 or the secondary holes 32. The other of the secondary holes 32 or throughways 28 can be blocked off by a plug or a sealant. The tubing plumbs the sensor 10 into, for example, a differential pressure monitoring system.

In use, fluid (such as air) within the conduit can be either (a) evacuated to establish low pressure state within the conduit; or (b) pressurized to establish a high pressure state within the conduit, relative to ambient pressure. A gap, which exists between the component (or components) and the shank of the fastener assembly, can be arranged to be at a differential pressure to the conduit, such as, for example, atmospheric pressure. When a crack of sufficient size extends through the component, a fluid flow path is formed through the crack, and between the gap and the channel 20. Where a pressure differential exists between two regions of the crack, fluid may flow through the crack. Accordingly, a change in fluid flow through the conduit (which may be observed as a change in pressure state of the conduit) can be indicative of the presence of the crack.

As shown in FIG. 1, in some embodiments the second surface 18 of the body portion 12 can be provided with channels or notches 34 that extend in a radial direction between the hole 14 and an outer edge of the body portion 12. The channels 34 can assist establishing fluid communication between the atmosphere surrounding the fastener assembly, and the gap that exists between the component(s) and the shank of the fastener element.

As the conduit is continuous between the throughways 28, it is possible to test for a blockage in the conduit. A blockage indicates that continuity does not exist through the conduit and that portions of the sensor 10 are inactive. Clearly, a crack that intercepts an inactive portion of the conduit will not be detected. For example, a continuity test may be achieved by introducing fluid into the conduit via one of the throughways 28 and monitoring the steady state flow of fluid exhausted via the corresponding other throughway 28.

Figure 4:
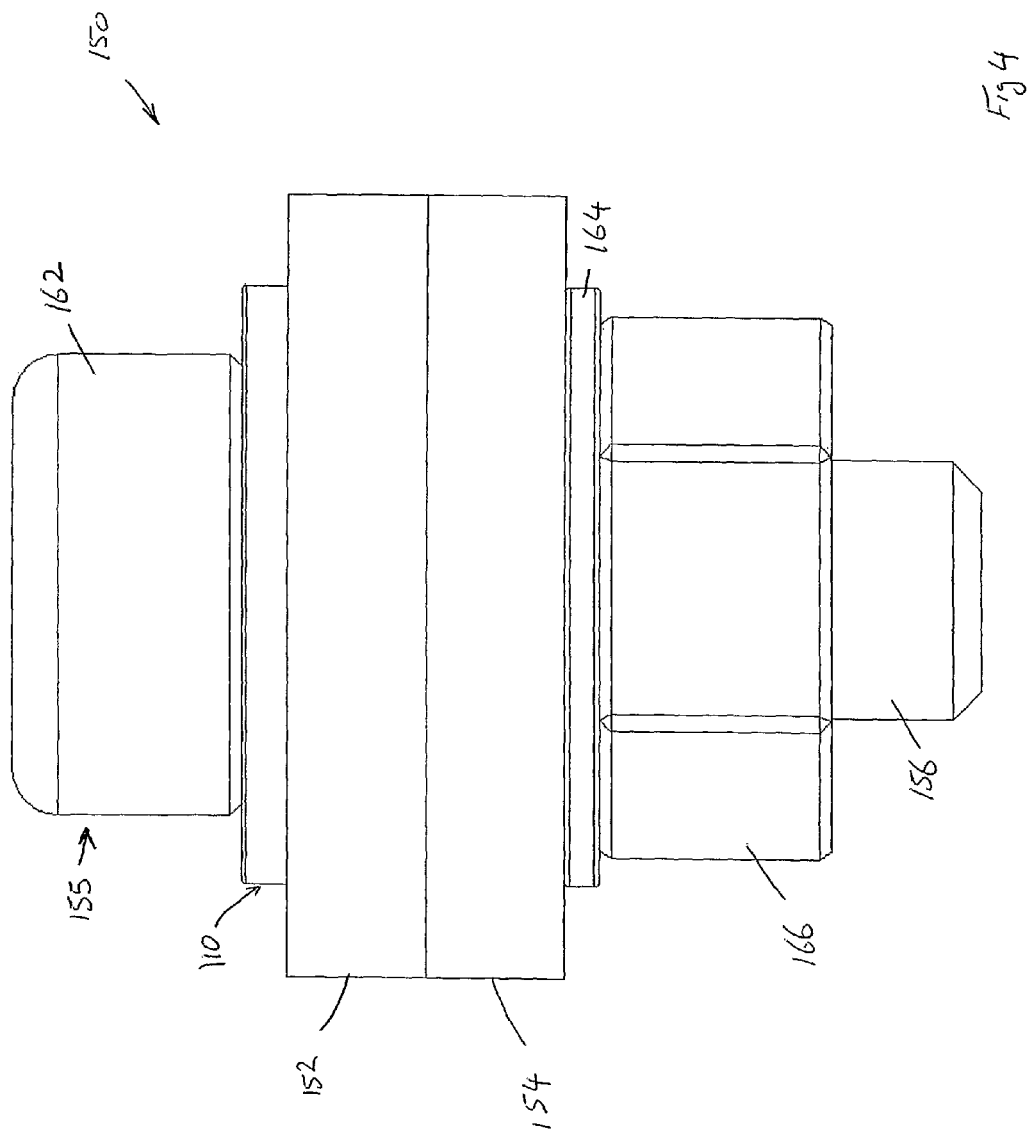
FIG. 4: is a side elevation view of fastener assembly that incorporates a sensor in accordance with a second embodiment of the present invention.
Figure 7:
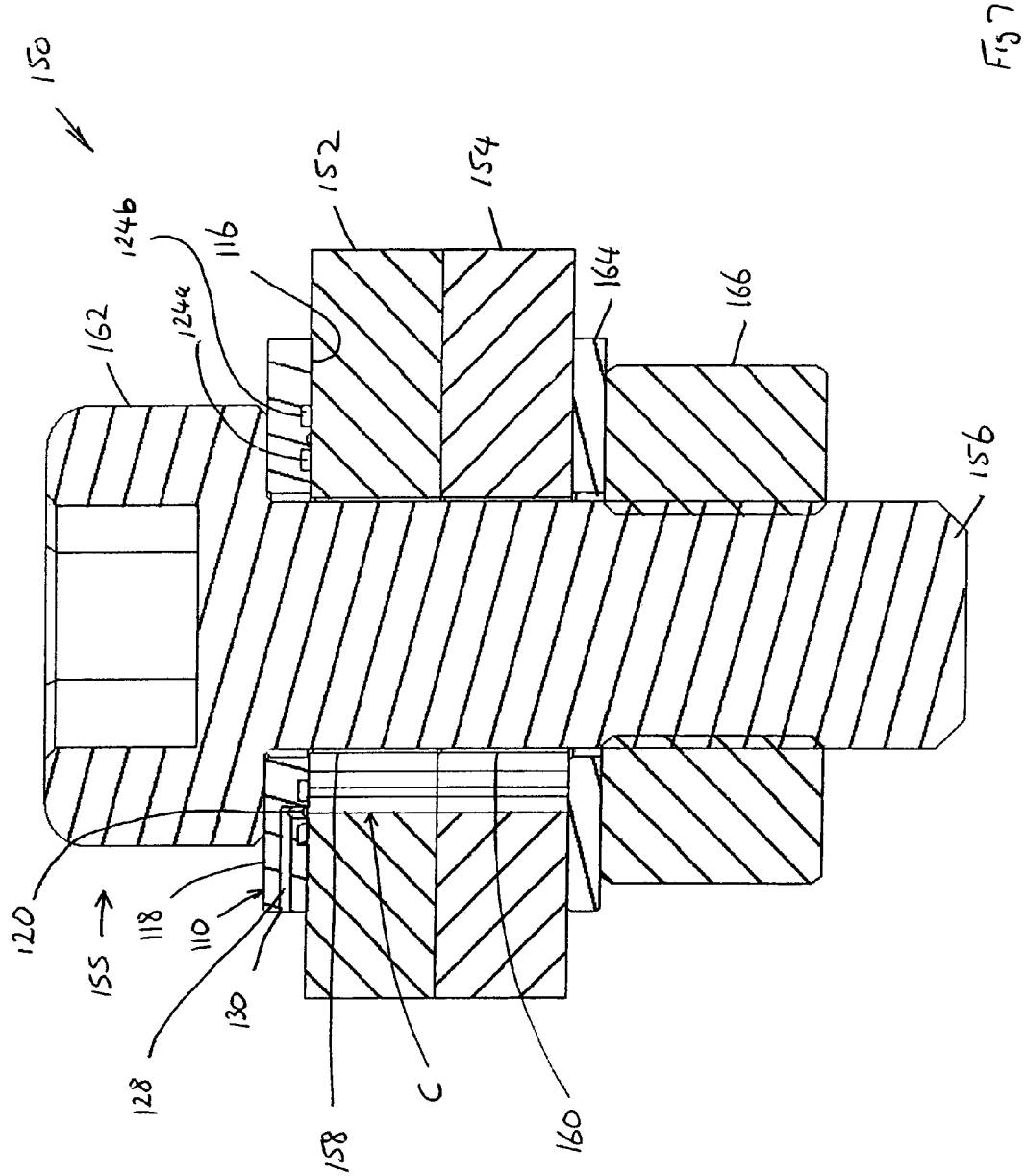
FIG. 7: is a side cross sectional view of fastener assembly of FIG. 4.

FIGS. 4 and 7 show a fastener assembly 150 that fastens a first component 152 to a second component 154. The fastener assembly 150 has a bolt 155 with a head 162, and a shank 156 that extends through holes 158, 160 in each of the first and second components 152, 154, respectively. A sensor 110 (as also shown in FIGS. 5 and 6) according to a second embodiment is disposed between the head 162 and the first component 152. The fastener assembly 150 further has a washer element 164 and a nut 166. The shank 156 is provided with an external thread (not shown) and the nut 166 is provided with a complementary internal thread. Both the washer 164 and the nut 166 are disposed about the shank 156 with the washer 164 in contact with the second component 154.

A tensile load is established in the shank 156 such that the sensor 110, the first and second components 152, 154, and the washer 164 are all held in compression between the head 162 and the nut 166.

The sensor 110 has a body portion 112 that defines a hole 114 through which a fastener element (such as the shank of a bolt) can pass. In this embodiment, the body portion 112 has the form of a generally annular ring. The body portion 112 also has a first surface 116 and a second opposing surface 118. Accordingly, in this embodiment, the sensor 110 has an overall shape that is similar to that of a washer or disc.

The body portion 112 has a cavity, which in this embodiment is in the form of a channel 120 that extends partially through the thickness of the body portion 112 and opens onto the first surface 116. In this embodiment, the channel 120 extends concentrically about the hole 114. Furthermore, in this embodiment, the channel 120 is in the form of an annular ring.

Two annular grooves 122a, 122b are formed in the first surface 116. The first groove 122a is concentric with the channel 120 and has an outer diameter that is less than the inner diameter of the channel 120. The second groove 122b is concentric with the channel 120 and has an inner diameter that is less than the outer diameter of the channel 120. The sensor 110 is further provided with a sealing system, which in this embodiment is in the form of two compressible elements. Furthermore, the compressible elements in this embodiment are o-rings 124a, 124b. Each o-ring 124a, 124b is disposed within a respective one of the grooves 122a, 122b. In their relaxed state, each o-ring 124a, 124b has a thickness that is greater than the depth of the respective grooves 122a, 122b.

As shown in FIG. 7, in response to a compressive load applied to the body portion, which is generated by tension in the shank of the fastener element, the o-rings 124a, 124b can both be deformed. In this embodiment, the o-rings 124a, 124b can be made of an elastomeric material. Accordingly, the deformation is largely elastic. Thus, substantially hermetic seals can be formed about the channel 120, between the body portion 112 and the first component 152.

A benefit of the use of the o-rings is that irrespective of the tension in the fastener and thus the compressive load, the load on the o-rings and thus the sealing will remain substantially constant as the compressive load is transmitted through metal to metal contact throughout the assembly. In general, the compressive load on the o-rings will be determined by the hardness of the material from which they are made and the shape of the grooves 122 in which they sit.

The body portion 112 is further provided with a throughway 128 that extends through the body portion 112, and between an opening 130 on a circumferential edge of the body portion 112 and the channel 120. Accordingly, the channel 120 is in fluid communication with the throughway 128.

Tubing (not shown) to plumb the sensor 110 into a differential pressure monitoring system (also not shown) can be connected to the throughway 128 such that the tubing is in isolated fluid communication with the throughway 128.

The channel 120 and the surface of the first component 152 together form a conduit. When the first component 152 is intact, the channel 120 (and thus the conduit) can be in fluid isolation from the surrounding environment.

FIG. 7 shows cracks C in each of the first and second components 152, 154, which extend from the holes 158, 160, respectively. The crack C in the first component 152 opens onto the surface adjacent the sensor 110, and intersects the channel 120.

In use, fluid (such as air) within the conduit can be evacuated or pressurized to establish a pressure differential between the conduit and ambient pressure. A gap, which exists between the first and second components 152, 154 and the shank 156 of the bolt 155, can be arranged to be at a differential pressure to the conduit, such as, for example, atmospheric pressure. When the crack C is of sufficient size a fluid flow path is formed through the crack C, and between the gap and the channel 120. Where a pressure differential exists between two regions of the crack, fluid may flow through the crack C. Accordingly, a change in fluid flow through the conduit (which may be observed as a change in pressure state of the conduit) can be indicative of the presence of the crack C.

The compressible elements may be formed by dispensing an elastomeric material into the grooves 122a, 122b. The elastomeric may be delivered in an uncured state such that it flows readily during dispensing, but subsequently cures to form a stiffer material.

Figure 8:
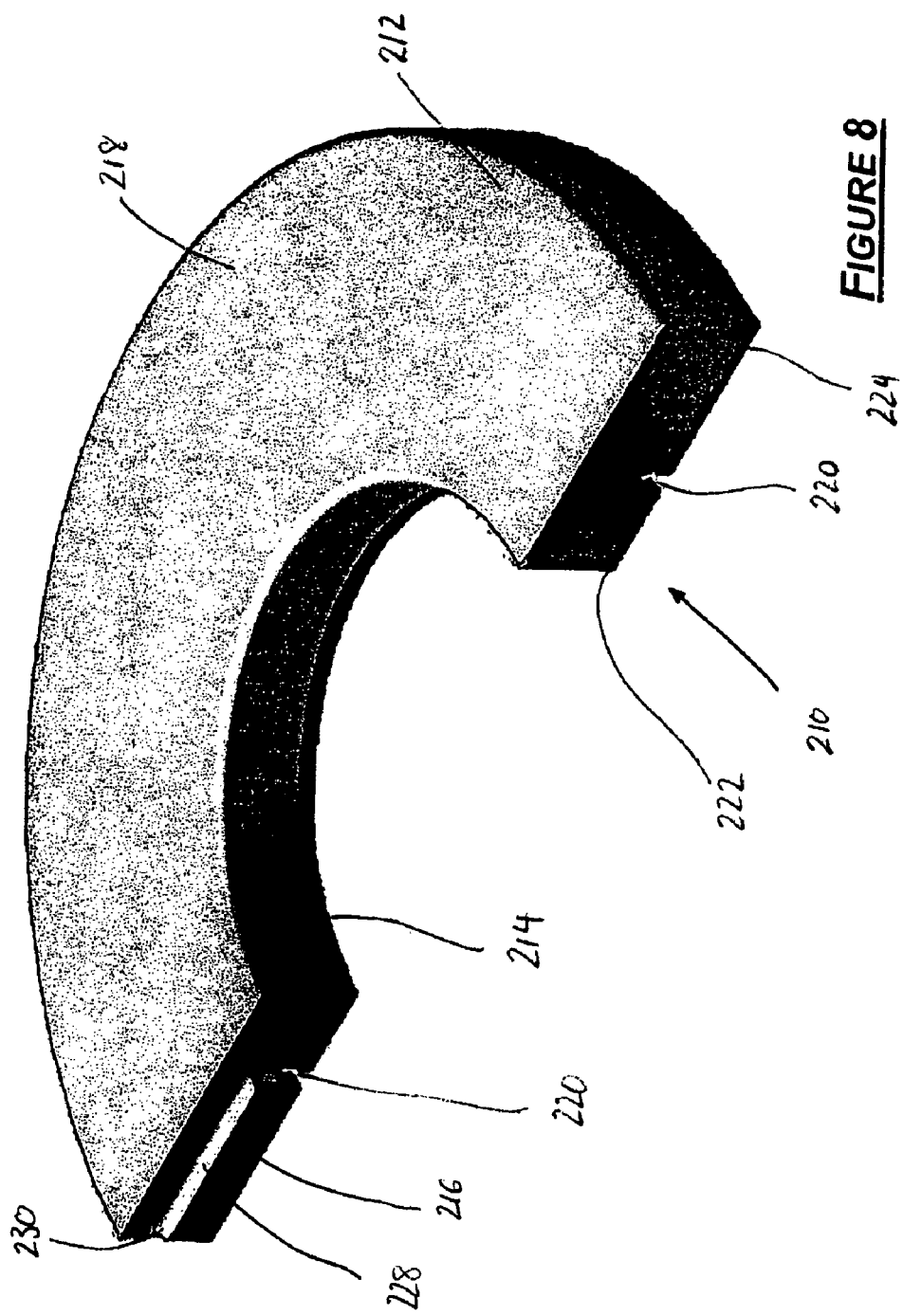
FIG. 8: is an axonometric cross sectional view of a sensor in accordance with a third embodiment of the present invention.
Figure 9:
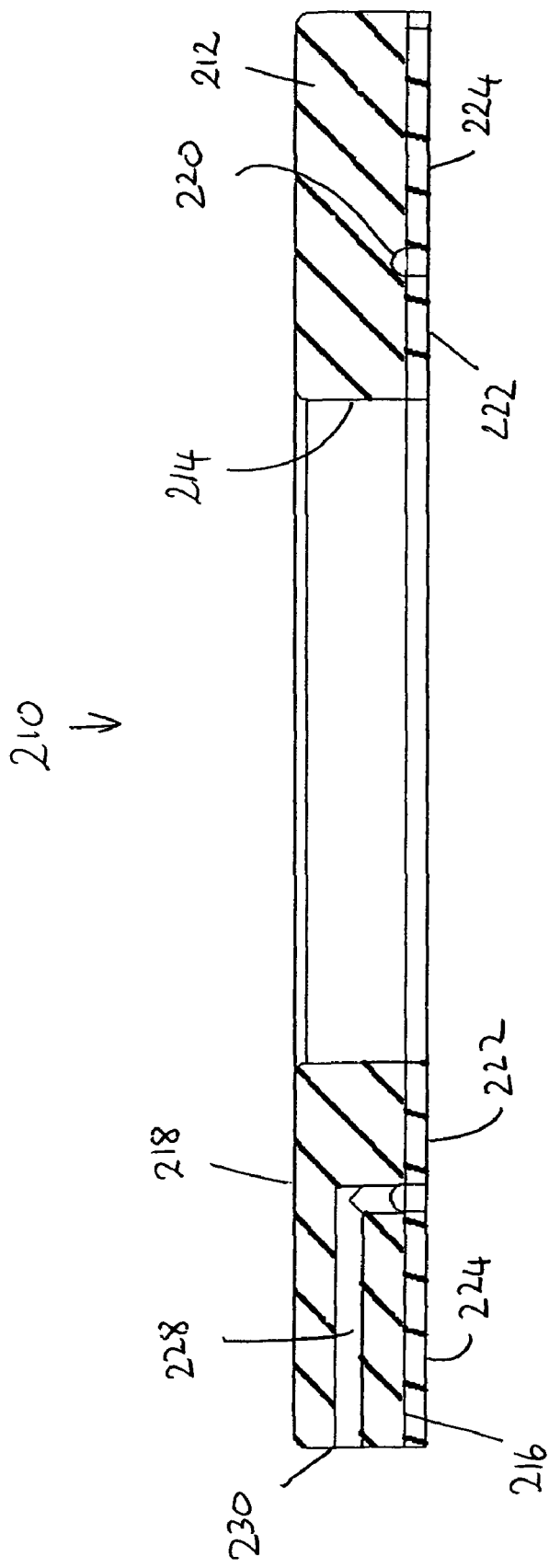
FIG. 9: is a side cross sectional view of the sensor of FIG. 8.

FIGS. 8 and 9 show a sensor 210 in accordance with a third embodiment. The sensor 210 has a body portion 212 that defines a hole 214 through which a fastener element (such as the shank of a bolt) can pass. The body portion 212 has the form of a generally annular ring. The body portion 212 also has a first surface 216 and a second opposing surface 218.

The body portion 212 has a cavity, which in this embodiment is in the form of a channel 220 that extends partially through the thickness of the body portion 212 and opens onto the first surface 216. In this embodiment, the channel 220 extends concentrically about the hole 214. Furthermore, in this embodiment, the channel 220 is in the form of an annular ring.

The sensor 210 is further provided with a sealing system, which in this embodiment is in the form of first and second compliant annular rings 222, 224. The first compliant annular ring 222 has an inner diameter that is substantially the same as the diameter of the aperture 214, and an outer diameter that is substantially the same as the inner diameter of the channel 220. The second compliant annular ring 224 has an inner diameter that is substantially the same as the outer diameter of the channel 220, and an outer diameter that is substantially the same as the outer diameter of the body portion 212. Both the first and second compliant annular rings 222, 224 are affixed to the first surface 216 of the body portion 212.

The body portion 212 is further provided with a throughway 228 that extends through the body portion 212, and between an opening 230 on a circumferential edge of the body portion 212 and the channel 220. Accordingly, the channel 220 is in fluid communication with the throughway 228.

In response to a compressive load, such as loads generated by the tensioned fastener assembly, the first and second compliant annular rings 222, 224 can be deformed. In this embodiment, the first and second compliant annular rings 222, 224 are formed of material that is at least partially elastic. Accordingly, the deformation is largely elastic. Thus, in use, substantially hermetic seals can be formed about the channel 120, between the first surface 216 of the body portion 212 and the surface of the component in contact first and second compliant annular rings 222, 224.

Figure 10:
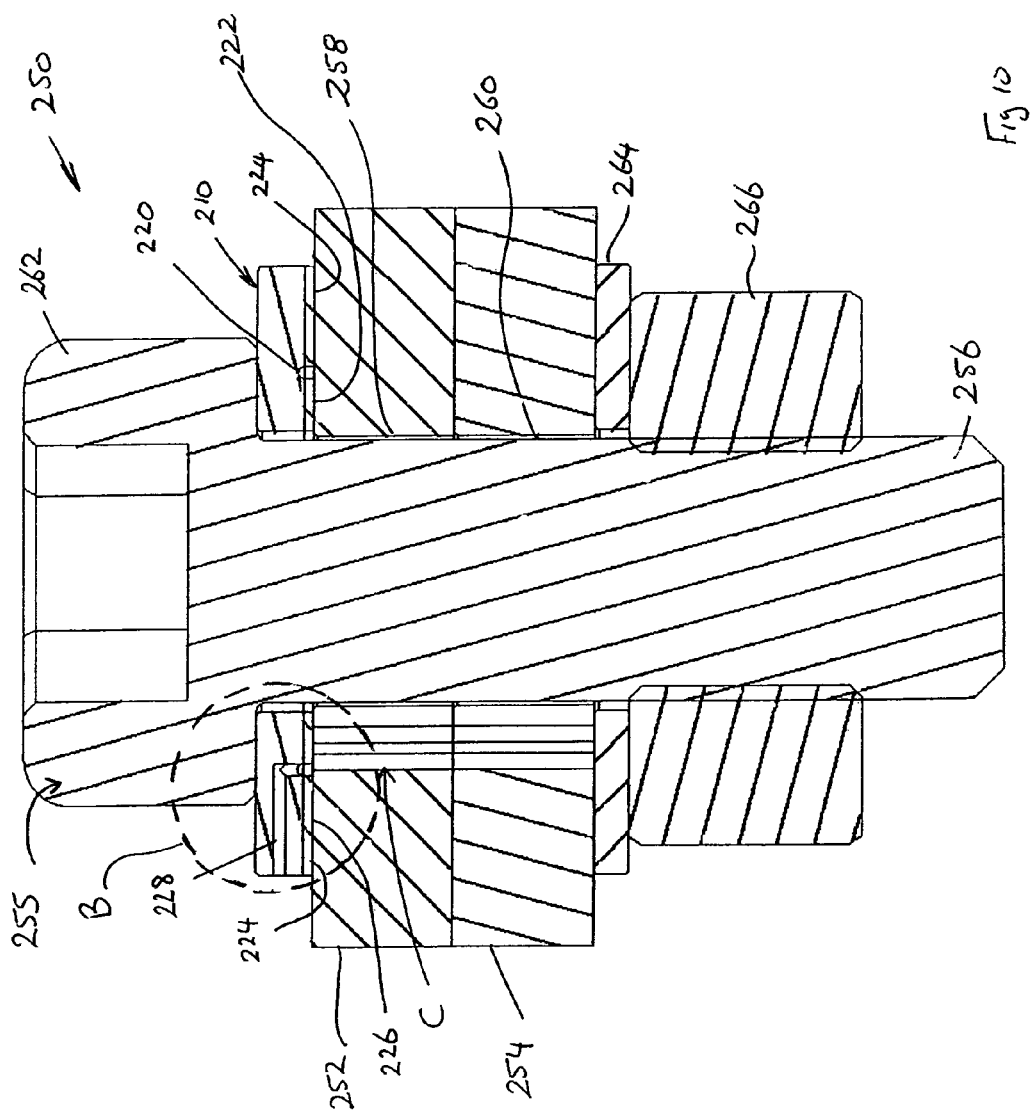
FIG. 10: is a side cross sectional view of a fastener assembly that incorporates the sensor of FIG. 8.
Figure 11:
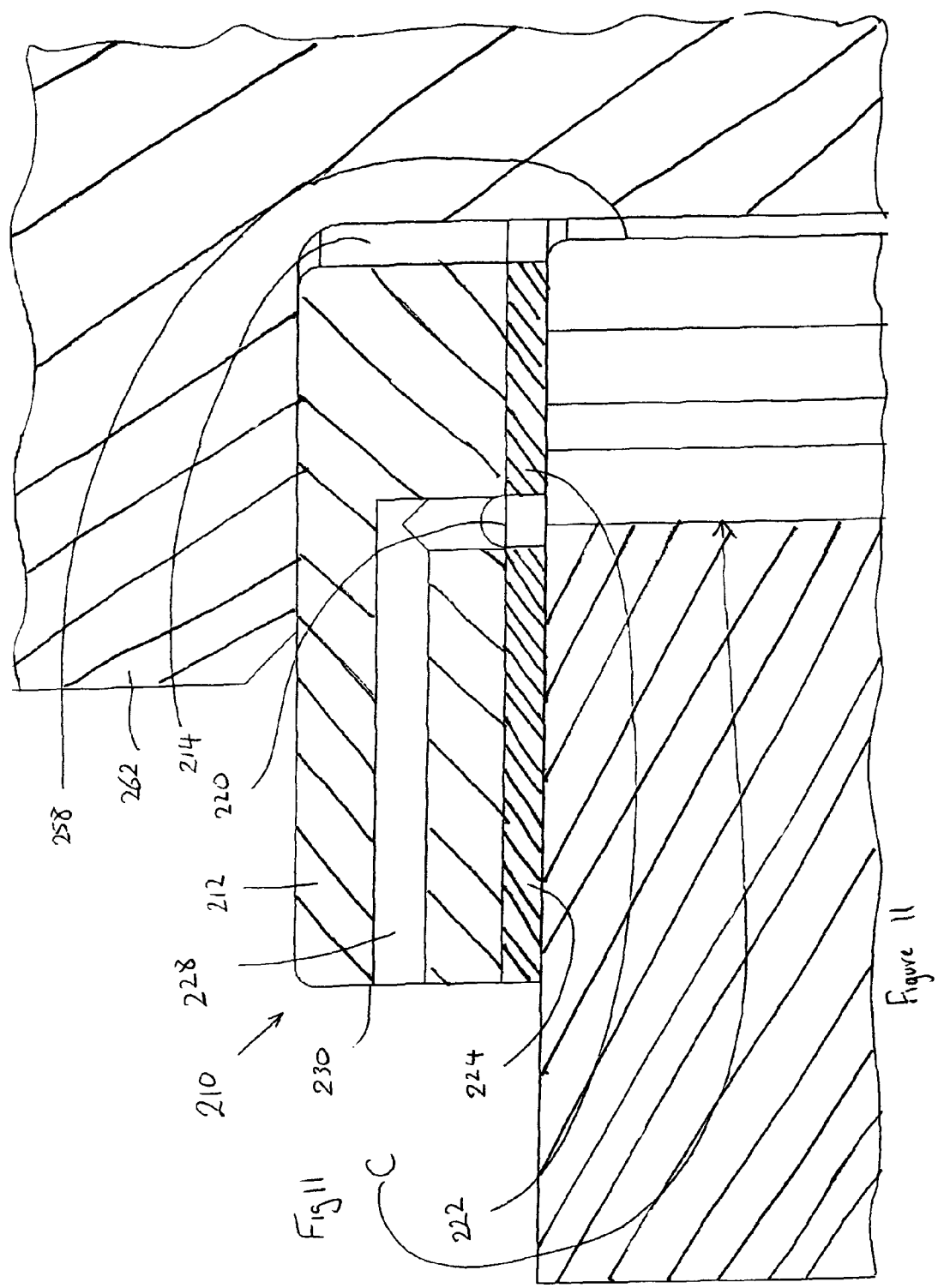
FIG. 11: is a view of detail B of FIG. 10.

FIGS. 10 and 11 show a fastener assembly 250 that fastens a first component 252 to a second component 254. The fastener assembly 250 has bolt 255 with a shank 256 that extends through holes 258, 260 in each of the first and second components 252, 254 respectively. The shank 256 extends from, and is integral with, the head 262 of the bolt 255. Sensor 210 is disposed between the head 262 and the first component 252. The fastener assembly 250 further has a washer element 264 and a nut 266. The shank 256 is provided with an external thread (not shown) and the nut 266 is provided with a complementary internal thread. Both the washer 264 and the nut 266 are disposed about the shank 256 with the washer 264 in contact with the second component 254.

A tensile load is established in the shank 256 such that the sensor 210, the first and second components 252, 254, and the washer 264 are all held in compression between the head 262 and the nut 266. It is to be appreciated that the material of the first and second compliant annular rings 222, 224 should be sufficiently rigid that when a compressive load (such as that applied by a fastener assembly in normal operating conditions) is applied, the material is not excessively deformed such that the gap between the first and second compliant annular rings 222, 224 is not pinched or otherwise constricted.

Tubing (not shown) to plumb the sensor 210 into a differential pressure monitoring system (also not shown) can be connected to the throughway 228 such that the tubing is in isolated fluid communication with the throughway 228.

The channel 220 and the surface of the first component 252 together form a conduit. When the sensor 210 is applied to a first component 252 that is intact, the conduit can be in fluid communication with the throughway 228, but in fluid isolation from the atmosphere surrounding the sensor 210.

FIGS. 10 and 11 show cracks C in each of the first and second components 252, 254, which extend from the holes 258, 260, respectively. The crack C in the first component 252 opens onto the surface adjacent the sensor 210, and intersects the channel 220.

In use, fluid (such as air) within the conduit can be evacuated or pressurized to establish pressure differential between the conduit and ambient pressure. A gap, which exists between the first and second components 252, 254 and the shank 256 of the bolt 255, can be arranged to be at a differential pressure to the conduit, such as, for example, ambient atmospheric pressure. When the crack C is of sufficient size a fluid flow path is formed through the crack C, and between the gap and the channel 220. Where a pressure differential exists between two regions of the crack, fluid may flow through the crack C. Accordingly, a change in fluid flow through the conduit (which may be observed as a change in pressure state of the conduit) can be indicative of the presence of the crack C.

Figure 12:
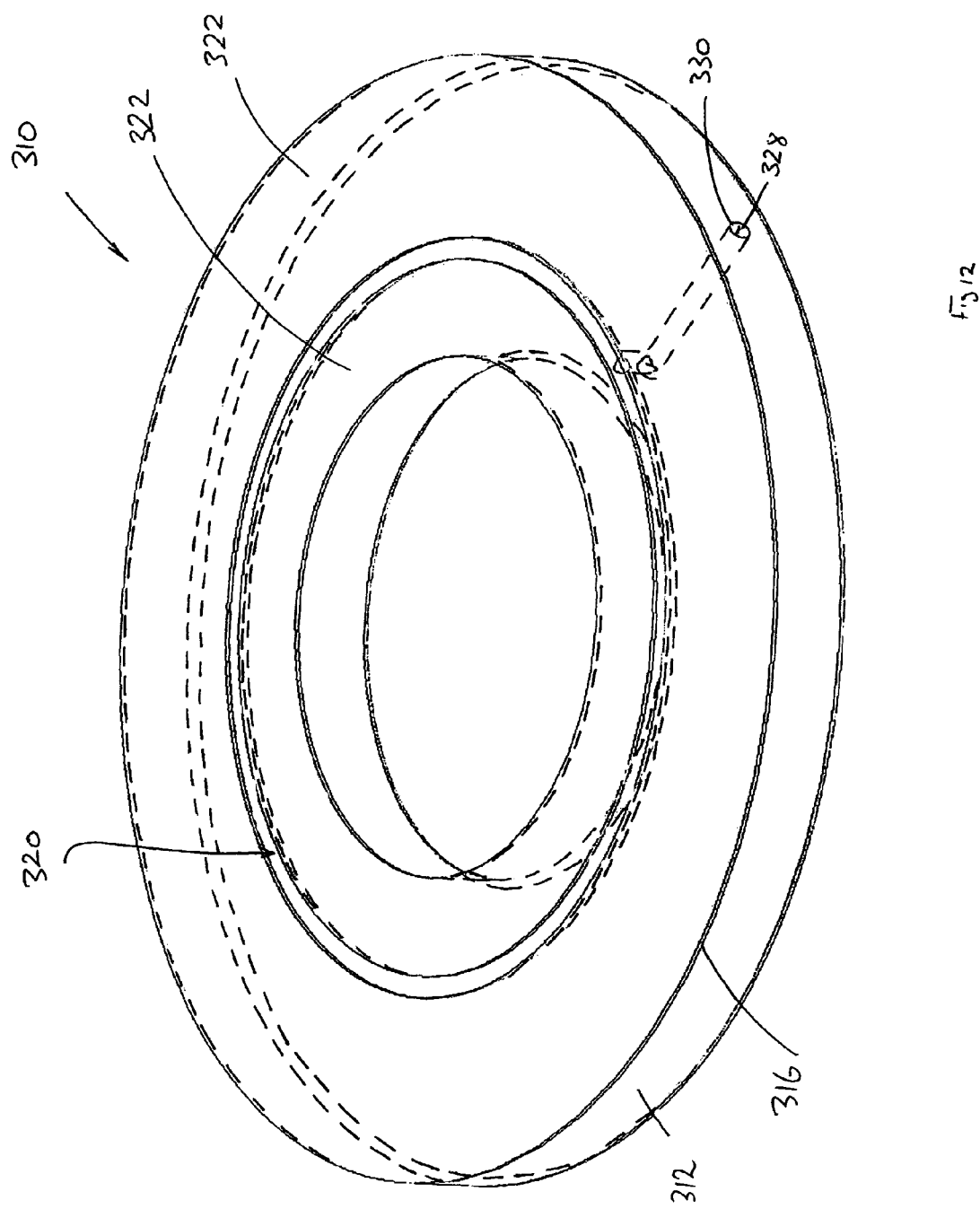
FIG. 12: is a bottom axonometric view of a sensor in accordance with a fourth embodiment of the present invention.
Figure 13:
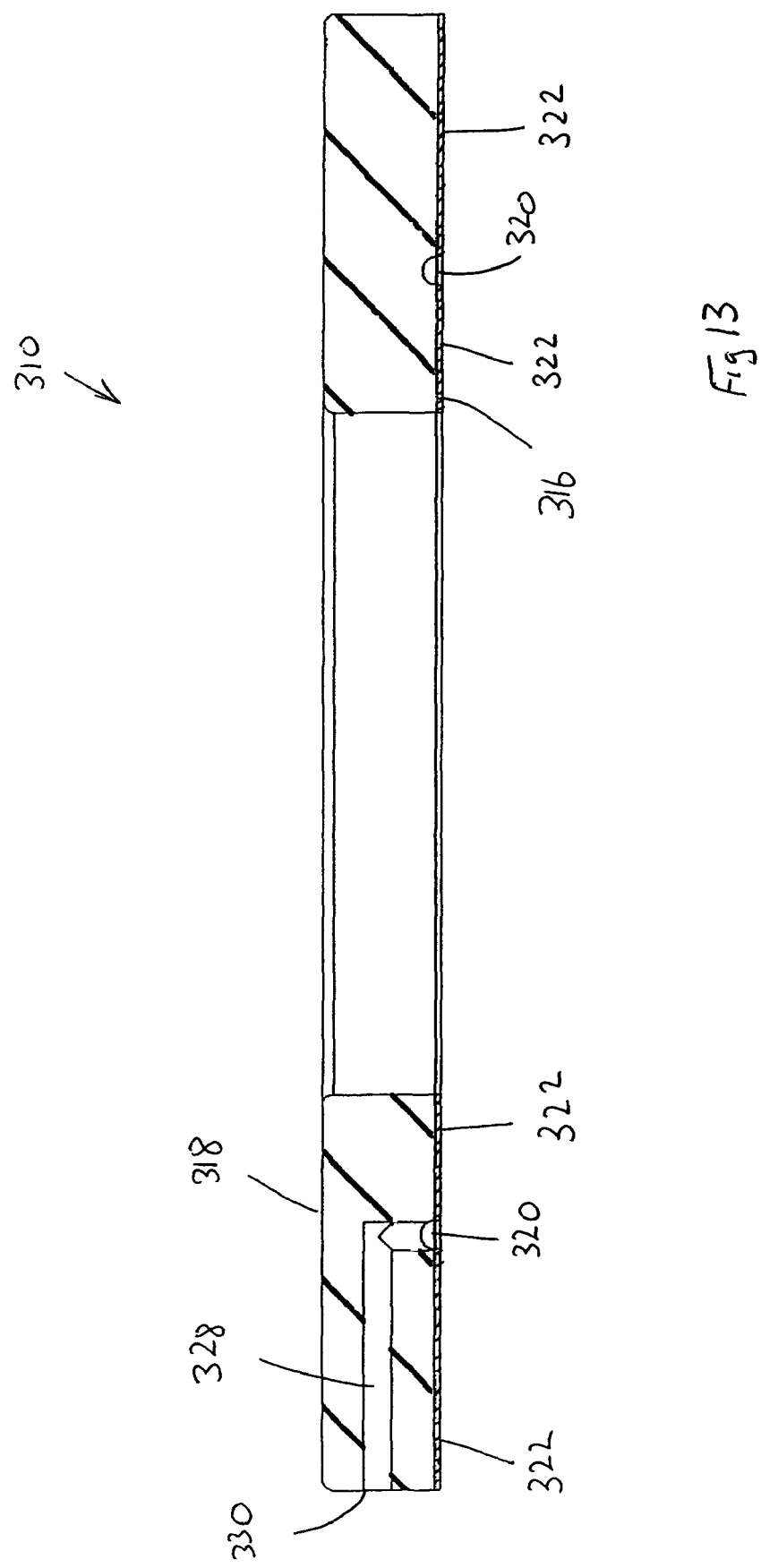
FIG. 13: is a side cross sectional view of the sensor of FIG. 12.
Figure 14:
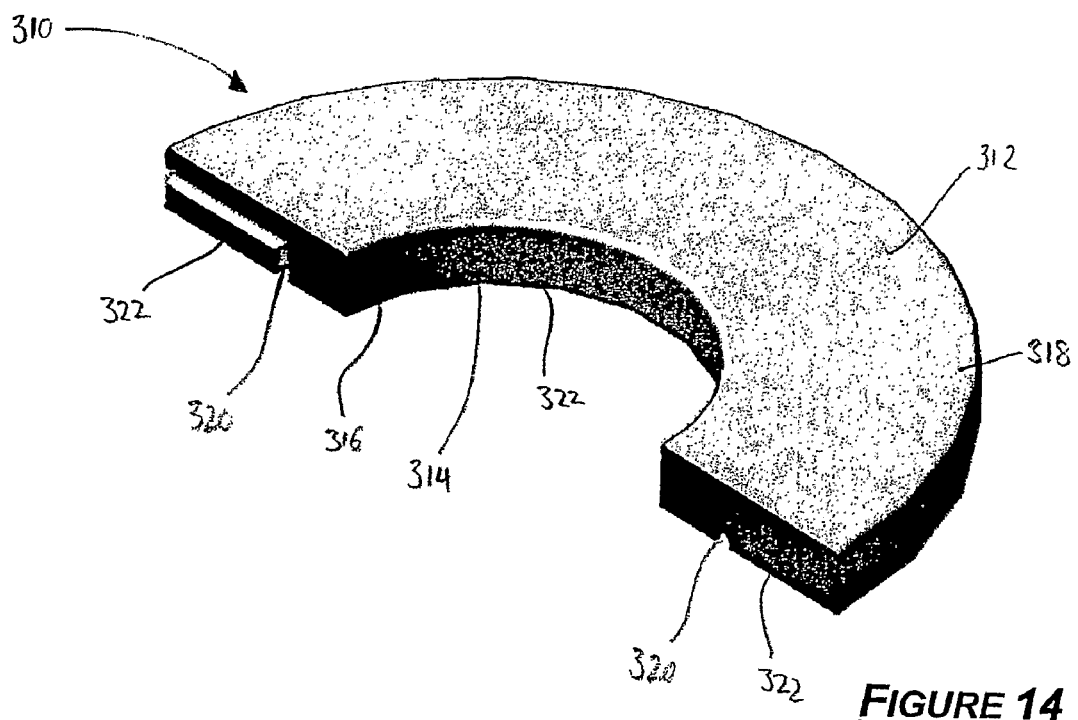
FIG. 14: is an axonometric cross sectional view of the sensor of FIG. 12.

FIGS. 12 to 14 show a sensor 310 in accordance with a fourth embodiment. The sensor 310 has a body portion 312 that defines a hole 314 through which a fastener element (such as the shank of a bolt) can pass. The body portion 312 has the form of a generally annular ring. The body portion 312 also has a first surface 316 and a second opposing surface 318.

The body portion 312 has a cavity, which in this embodiment is in the form of a channel 320 that extends partially through the thickness of the body portion 312 and opens onto the first surface 316. In this embodiment, the channel 320 extends concentrically about the hole 314. Furthermore, in this embodiment, the channel 320 is in the form of an annular ring.

The sensor 310 is further provided with a sealing system, which in this embodiment is in the form of a flowable sealant 322 that is applied to the first surface 316, such that the sealant 322 surrounds the channel 320.

The body portion 312 is further provided with a throughway 328 that extends through the body portion 312, and between an opening 330 on a circumferential edge of the body portion 312 and the channel 320. Accordingly, the channel 320 is in fluid communication with the throughway 328.

Figure 15:
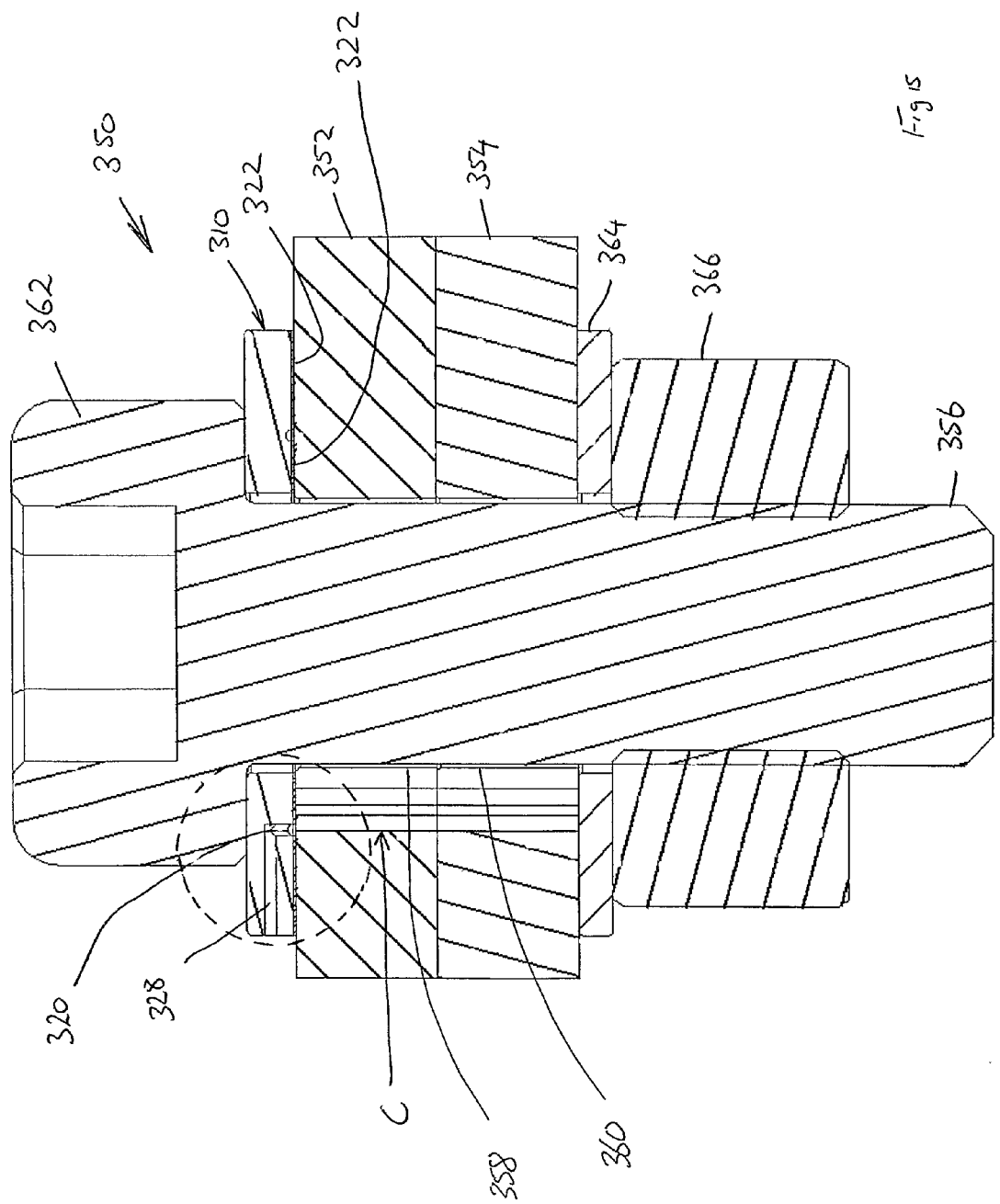
FIG. 15: is a side cross sectional view of a fastener assembly that incorporates the sensor of FIG. 12.
Figure 16:
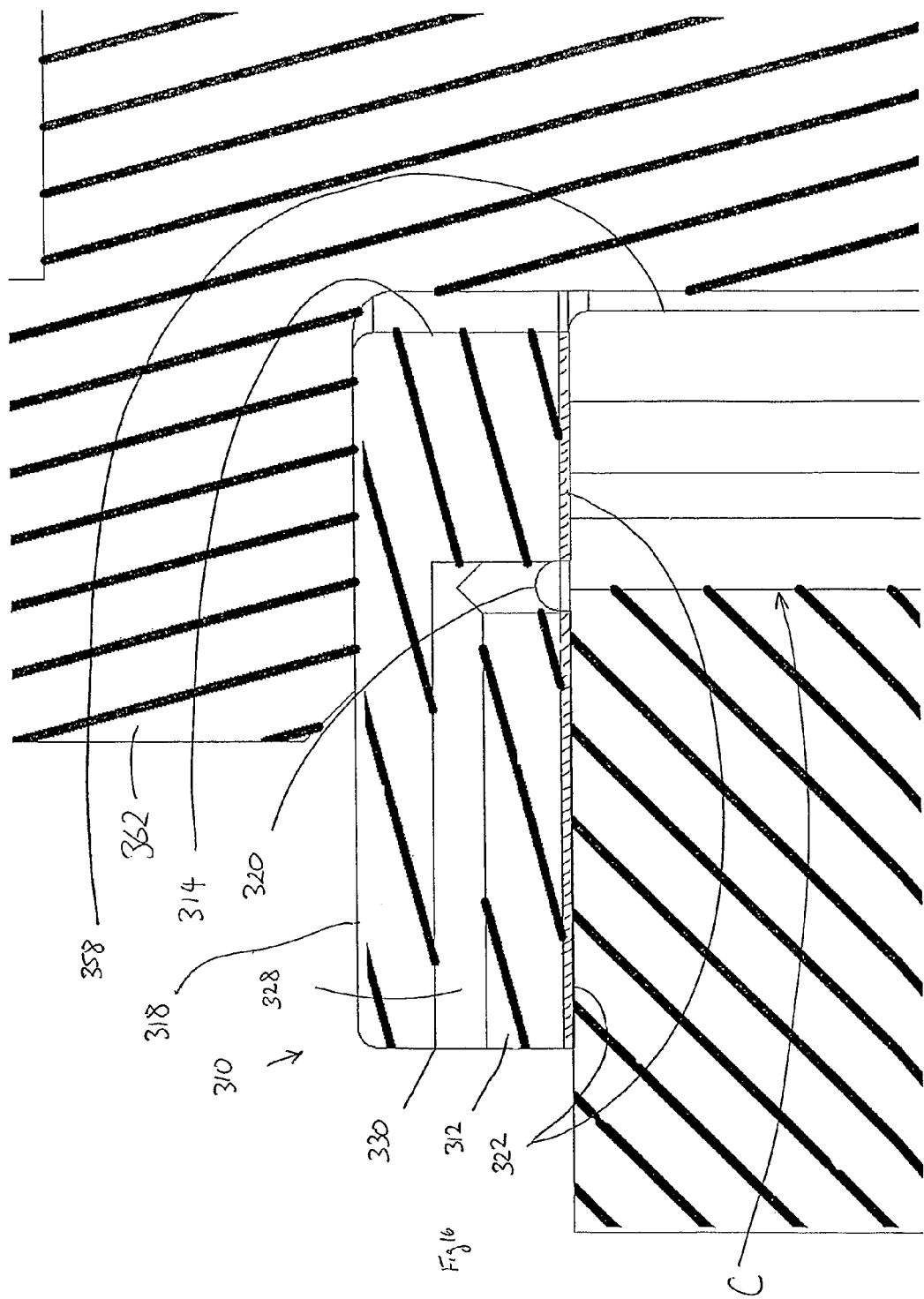
FIG. 16: is a view of detail D of FIG. 10.

FIGS. 15 and 16 show a fastener assembly 350 that fastens a first component 352 to a second component 354. The fastener assembly 350 has bolt 355 with a head 362, and a shank 356 that extends through holes 358, 360 in each of the first and second components 352, 354 respectively. Sensor 310 is disposed between the head 362 and the first component 352. The fastener assembly 350 further has a washer element 364 and a nut 366. The shank 356 is provided with an external thread (not shown) and the nut 366 is provided with a complementary internal thread. Both the washer 364 and the nut 366 are disposed about the shank 356 with the washer 364 in contact with the second component 354.

A tensile load is established in the shank 356 such that the sensor 310, the first and second components 352, 354, and the washer 364 are all held in compression between the head 362 and the nut 366.

The thickness of the sealant 322 can be selected according to the surface roughness of the first component 352 and the first surface 316 of the body portion 312. Moreover, the thickness of the sealant 322 can be selected to be equal to the greater surface roughness of the first component 352 and the first surface 316. Accordingly, when a compressive load is applied to the sensor 310 and the first component 352 and the body portion 312 brought into direct physical contact, the sealant 322 flows into the gaps and cavities that exist between the first component 352 and the body portion 312. Thus, a substantially hermetic seal can be formed between the first surface 316 of the sensor 310 and the first component 352. The sealant 322 can be viewed as being activated by compression (that is, a compressive load applied to the sealant) because the sealant 322 flows in response to a compressive load to establish the substantially hermetic seal.

This method also in substance provides metal contact between the sensor 310 and the first component 352 to transmit compressive load. Maintaining the metal to metal contact has benefits in terms of maintaining the tension in the fastener over long periods of time. In contrast, sealing systems that have elements which are sandwiched between metal components can in time creep or deform thereby changing the fastener tension and thus adversely affect the strength of a join.

Tubing (not shown) to plumb the sensor 310 into a differential pressure monitoring system (also not shown) can be connected to the throughway 328 such that the tubing is in isolated fluid communication with the throughway 328.

The channel 320 and the surface of the first component 352 together form a conduit. When the sensor 310 is applied to a first component 352 that is intact, the conduit can be in fluid communication with the throughway 328, but in fluid isolation from the atmosphere surrounding the sensor 310.

FIGS. 15 and 16 show cracks C in each of the first and second components 352, 354, which extend from the holes 358, 360, respectively. The crack C in the first component 352 opens onto the surface adjacent the sensor 310, and intersects the channel 320.

In use, fluid (such as air) within the conduit can be evacuated or pressurized to establish a pressure differential between the conduit and ambient pressure. A gap, which exists between the first and second components 352, 354 and the shank 356 of the bolt 355, can be arranged to be at a differential pressure to the conduit, such as, for example, ambient atmospheric pressure. When the crack C is of sufficient size a fluid flow path is formed through the crack C, and between the gap and the channel 320. Where a pressure differential exists between two regions of the crack, fluid may flow through the crack C. Accordingly, a change in fluid flow through the conduit (which may be observed as a change in pressure state of the conduit) can be indicative of the presence of the crack C.

It will be understood to persons skilled in the art of the invention that many modifications may be made without departing from the scope of the invention.

Embodiments of the sensor described in reference to the figures have overall shape of a plate or washer. It is to be appreciated that embodiments of the sensor may be incorporated into alternative fastener elements, such as a nut, or the head of a bolt or rivet. Indeed, in one embodiment in which the sensor is provided in the head of a bolt, the bolt head may be counter sunk, such that the first surface is a conical frustum. However, it is to be appreciated that in order to monitor for the presence of surface cracking in the component the channel in the fastener element should be disposed adjacent the surface of the component.

Figure 17:
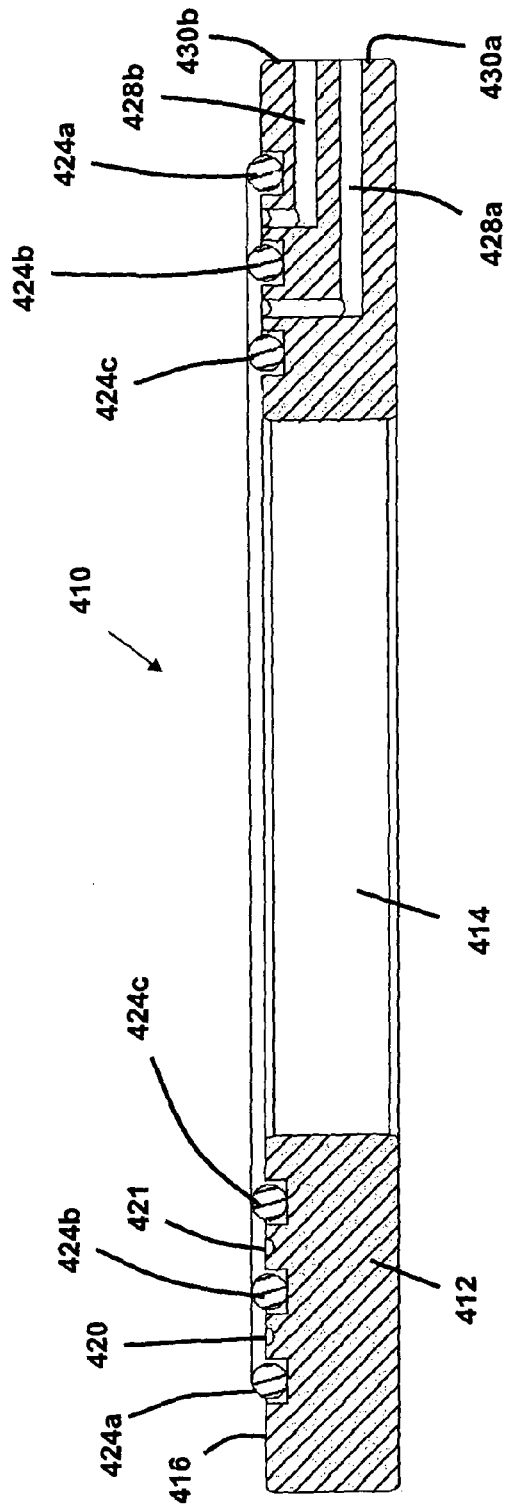
FIG. 17: is a side cross section view of a fifth embodiment of the sensor.

Furthermore, embodiments of the sensor described in reference to the figures have a single cavity (i.e., channel) in the body portion. It is also to be appreciated that alternative embodiments may be provided that have two or more spaced apart cavities that open onto the first surface. For example, as shown in FIG. 17 one embodiment of the sensor 410 is provided a body portion 412 having a first surface 416 onto which open two concentric, annular cavities 420 and 421 that are spaced apart and substantially in fluid isolation from one another. In this embodiment the sealing system comprises three o-rings 424a, 424b and 424c. O-rings 424a and 424b will form a substantially hermetic seal on opposite sides of channel 420, while o-rings 424b and 424c will form a substantially hermetic seal on opposite sides of channel 421. When such an embodiment is provided in a fastener assembly, a surface crack that propagates from the hole (through which a portion of the fastener assembly extends) may first intersect a first (inner) channel 421. Following further crack growth, the surface crack may intersect a second (outer) channel 420. Throughways 428a and 428b provide fluid communication between channels 420 and 421 respectively and corresponding openings or ports 430a and 430b. In this embodiment the channel 421 may be vented to atmosphere via throughway 428b while channel 420 is placed in a higher or lower pressure state and coupled to a pressure monitoring system via the throughway 428a and port 430a. Accordingly, the rate of crack growth can be determined.

In the embodiments illustrated in the figures, the channels are either circular or C-shaped in their arrangement on the first surface of the body portion. However, it is to be appreciated that the channel (or channels) of the sensor may be of alternative shapes. For example, the channel(s) may have vertices. Furthermore, the channel(s) may have segments of varied radii, or even straight segments.

It is to be appreciated that, in some embodiments, relative rotation of the body portion with respect to the seal may cause interference between the seal and the channel(s) in the body portion. Relative rotation may occur when the fastener assembly is being tightened to the desired torque. Such interference may be detrimental to the performance of the sensor or, in the worst case, cause the channels to be completely obstructed. The person skilled in the art will appreciate that the effects of relative rotation between the seal and the body portion may be more detrimental in embodiments in which the channels are not annular and concentric with the likely axis of rotation of the body portion during application of the fastener assembly to a structure.

Accordingly, in some embodiments the body portion may be provided with a structure to restrain the body portion from being rotated during assembly and/or removal of the fastener assembly. For example, side portions of the body portion may be provided with flats to receive a tool.

It is to be appreciated that in embodiments in which the sealing system is in the form of a sealant that is applied to the first surface of the body portion the relative depth of the channel(s) and thickness of the sealant on application should be carefully selected to minimize the likelihood of the channel(s) being blocked by the sealant.

Alternative embodiments may be provided in which the channel (or channels) and/or throughway (or throughways) are formed by affixing of two or more strata to one another. The stratum may be a single material, or two or more different materials. For example, strata of a titanium alloy may be used. Alternatively or additionally, plastics (such as, for example, polyimide) may be used.

In one such embodiment, a channel may be formed by an aperture that extends through the thickness of a first stratum that, in use, contacts the component/structure. A second stratum may be provided that extends across, and is affixed to, the first stratum to cover the aperture and form the channel. One or more throughways may be formed in the sensor in the first and/or second strata. Such a structure is described in Applicants' co-pending Australian Provisional Patent Application Number 2006901823, the contents of which are incorporated herein by way of reference.

It is to be appreciated that the connection between the body portion and the tubing may be of any desired type, provided that a connection is formed between the throughway and the tubing that plumbs the sensor into the monitoring system, with the two in fluid communication. Furthermore, the connection should also form a substantially hermetic seal. The connection may be established by interference of the tubing with the body portion defining the throughway. Alternatively, the tubing can be affixed to the body portion about the opening of the throughway. In a further alternative, a connector may be provided to which tubing can be attached. Such a connector may be of any suitable shape and/or structure, as will be apparent to the person skilled in the art.

Figure 18:
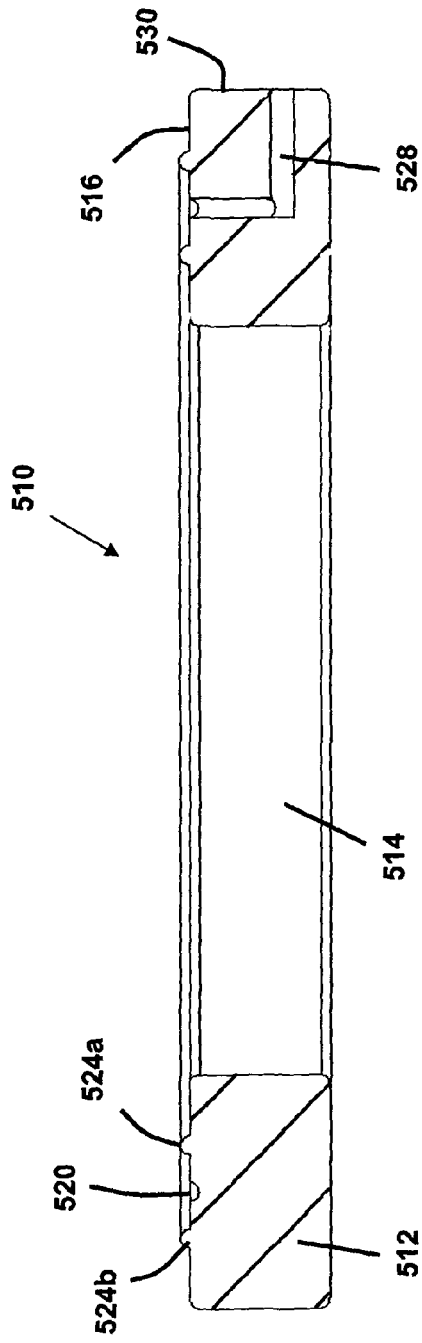
FIG. 18: is a side cross section view of a sixth embodiment of the sensor.

In one alternative embodiment exemplified in FIG. 18 the sensor 510 has a body portion with a first surface that, in use, is located adjacent the outer surface of a component or structure to be monitored. The first surface of the body portion has a pair of spaced apart ridges 524a and 524b that define a cavity 520 (such as, for example, an elongate channel) therebetween. The cavity 520 extends about a central axis of the sensor 510. For example, the body portion 512 may have a hole 514 through which the shank of a fastener element can be inserted.

Each of the ridges is raised relative to the surrounding area first surface of the body portion 512. The ridges 524a and 524b may form a knife-edge like protrusion. In use, the ridges are brought into direct physical contact with the outer surface of a component or structure to be monitored. When a compressive load is applied to the body portion the ridges are at least partially elastically deformed. As the contact surface area between the sensor and the outer surface of the component is small, the contact pressure is high. Accordingly, a substantially hermetic seal is established in response to the compressive load applied to the body portion, and thus the ridges function as an alternate form of sealing system. In this embodiment the cavity 520 is formed by and between the ridges and thus by the sealing system. The cavity 520 is not recessed into the first surface 516. However, in a variation of this embodiment the cavity can include a channel formed in the first surface 516 between the ridges 524a, 524b.

When the sensor is located on the surface of a component, the channel, the ridges and the outer surface of the component together form a conduit. The sensor further has a throughway 528 that extends through the body portion 512, and between an opening or port 530 on the body portion and the cavity 520. Thus, the conduit is in fluid communication with the throughway, but in fluid isolation from the atmosphere surrounding the sensor.

Tubing, such as flexible piping (not shown), can be connected to the throughway at the opening on the body portion. The tubing plumbs the sensor into, for example, a differential pressure monitoring system.

In the claims of this application and in the description of the invention, except where the context requires otherwise due to express language or necessary implication, the words "comprise" or variations such as "comprises" or "comprising" are used in an inclusive sense, i.e., to specify the presence of the stated features but not to preclude the presence or addition of further features in various embodiments of the invention.

The invention claimed is:

1. A sensor for detecting surface cracks in a components joined by a fastener assembly having a fastener element with a shank that passes through holes in the components, the sensor comprising:
   a body portion having: a first surface; a cavity that opens onto the first surface only; and a throughway that extends through the body portion and provides fluid communication between the cavity and a second surface of the body portion such that the shank of the fastener assembly can extend through the body portion; and
   a sealing system configured to be tensioned to establish a substantially hermetic seal between the first surface and an outer surface of the component or structure on opposite sides of the cavity in response to a compressive load that is exerted on the body portion.

2. The sensor according to claim 1 wherein the sealing system is in the form of a compliant material that can deform elastically under a compressive load.

3. The sensor according to claim 2, wherein the compliant material is affixed to the first surface.

4. The sensor according to claim 1 wherein the sealing system comprises a flowable sealant.

5. The sensor according to claim 1 wherein the sealing system comprises two compressible elements one on each side of the cavity.

6. The sensor according to claim 5, wherein two grooves are formed on the first surface, one on each side of the cavity, and in which respective compressible elements are seated.

7. The sensor according to claim 5, wherein each compressible element comprises an O ring.

8. The sensor according to claim 1 wherein the sealing system comprises two ridges formed on the first surface and between which the cavity is located, the ridges being formed from the same material as the body portion.

9. The sensor according to claim 8 wherein the ridges are formed integrally with the body portion.

10. The sensor according to claim 8 wherein the ridges are provided a knife edge.

11. The sensor according to claim 1, wherein the cavity extends about a central axis of the body portion.

12. The sensor according to claim 11, wherein the cavity extends wholly about the central axis to form an endless cavity.

13. The sensor according to claim 1, wherein the cavity comprises a channel formed in the body portion.

14. The sensor according to claim 11, wherein the cavity is concentric with the central axis.

15. The sensor according to claim 1, further comprising a hole that extends through the body portion and opens onto the first surface and an opposite surface of the body portion and wherein the cavity extends about the hole on the first surface only.

16. The sensor according to claim 1, wherein the body portion in form of a plate, disc or washer.

17. The sensor according to claim 1, wherein the body portion can support a compressive load with minimal deformation of the cavity.

18. The sensor according to claim 15, further comprising at least one channel formed on a surface of the body portion opposite the first surface and extends from the hole in the body portion to an outer edge of the body portion.

19. A sensor for detecting surface cracks in components joined by a fastener assembly having a fastener element with a shank that passes through holes in the components, the sensor comprising:
   a body portion having first surface; and
   a sealing system cooperating with the body portion to form a cavity that opens onto the first surface only such that the shank of the fastener assembly can extend through the body portion, the sealing system configured to be tensioned to form a substantially hermetic seal between the first surface and the outer surface of the component or structure on opposite sides of the cavity;
   wherein the body portion is provided with a conduit that provides fluid communication between the cavity and a port accessible on the body portion.

20. The sensor according to claim 19 wherein the sealing system comprises two spaced apart elements which form opposite sides walls of the cavity.

21. The sensor according to claim 20 wherein each element is a compressible element.

22. The sensor according to claim 21 wherein each element comprises an O ring.

23. The sensor according to claim 22 wherein each element comprises a ridge formed on the first surface, each ridge formed from the same material as the body portion.

24. The sensor according to claim 1 further comprising:
   a second cavity located within a boundary created by an innermost surface of the cavity and which opens onto the first surface; and
   a second throughway providing fluid communication between the second cavity and a second port on the body portion and wherein the sealing system establish a substantially hermetic seal between the first surface and the outer surface on opposite sides of the second cavity.

25. The fastener assembly for fastening a component or structure, the fastener assembly comprising at least one fastener element having a sensor according to claim 1.

26. The fastener assembly as claimed in claim 25, wherein the at least one fastener element comprises a bolt or a rivet having a head and a shank, and wherein the head is configured to comprise the sensor.

27. The fastener assembly as claimed in claim 25, wherein the at least one fastener element comprises a nut for a bolt and the nut comprises the sensor.

28. A method for detecting surface cracks in components joined by a fastener assembly having a fastener element with a shank that passes through holes in the components, the method comprising:
- providing a sensor comprising a body portion having a first surface; a cavity that opens only onto the first surface, and a throughway that extends through the body portion and provides fluid communication between the cavity and a second surface of the body portion;
- providing a sealing system that is operable between the first surface and portions of the first surface on opposites sides of the cavity;
- locating the sensor wherein the shank of the fastener assembly extends through the body portion and the first surface is adjacent an outer surface of a first of the components with the cavity facing the outer surface;
- tensioning the fastener assembly to exert a compressive load on the sensor wherein the sealing system establishes a substantially hermetic seal between the first surface and the outer surface on opposite sides of the cavity; and
- monitoring fluid flow through the cavity.

29. The sensor according to claim 1 comprising:
- a hole that extends through the body and opens onto the first surface and an opposite surface of the body; and one or more notches which extend across the opposite surface between an outer edge of the body portion and the hole.

30. The method according to claim 29 comprising: providing the sensor with a hole that extends through the body and opens onto the first surface and an opposite surface of the body; and one or more notches which extend across the opposite surface between an outer edge of the body portion and the hole; and, wherein the shank is passed through the hole.

* * * * *